United States Patent Office 2,718,519
Patented Sept. 20, 1955

2,718,519

PROCESS OF PREPARING 6-METHYL-$\Delta^6$-DESOXYMORPHINE

Horace D. Brown, Plainfield, N. J., assignor to Merck & Co., Inc., Rahway, N. J., a corporation of New Jersey No Drawing. Application November 22, 1952,
Serial No. 322,140

6 Claims. (Cl. 260—285)

This invention is concerned generally with the production of 6-methyl-$\Delta^6$-desoxymorphine. More particularly, it relates to a novel and improved method for preparing 6-methyl-$\Delta^6$-desoxymorphine by demethylation of the easily-obtainable 6-methyl-$\Delta^6$-desoxycodeine. The 6-methyl-$\Delta^6$-desoxymorphine is an extremely potent analgesic and possesses an analgesic activity over one hundred times that of morphine; in addition to its high potency, 6-methyl-$\Delta^6$-desoxymorphine possesses a very favorable therapeutic index as well as an extraordinary promptness of onset of analgesic action.

6-methyl-$\Delta^6$-desoxymorphine can be prepared by dehydration of 6-methyldihydromorphine using thionyl chloride as the dehydrating agent. This reaction, however, necessitates the employment of excess thionyl chloride reagent, a prolonged heating time and results in the obtainment of relatively low yields of the desired 6-methyl-$\Delta^6$-desoxymorphine. In contrast to the difficulties involved in the dehydration of 6-methyldihydromorphine, it has been found that dehydration of 6-methyl-dihydrocodeine is easily accomplished by heating together, in chloroform, equimolecular quantities of 6-methyl-dihydrocodeine and thionyl chloride and employing a relatively short heating time.

It was an object of my invention, therefore, to provide a method for converting the easily obtainable 6-methyl-$\Delta^6$-desoxycodeine to the desired 6-methyl-$\Delta^6$-desoxymorphine. In order to accomplish this conversion, however, it was necessary to ascertain reaction conditions which would achieve the hydrolysis of the phenolic ether grouping in the 3-position of the 6-methyl-$\Delta^6$-desoxycodeine without at the same time effecting rearrangement or degradation reactions in other parts of the molecule. The determination of such selective hydrolysis reaction conditions was complicated by the fact that 6-methyl-$\Delta^6$-desoxycodeine is very sensitive both to extremes of temperature as well as to acidic reagents conventionally employed for the hydrolysis of ethers.

I have discovered, surprisingly enough, that this selective hydrolysis reaction can be achieved by heating 6-methyl-$\Delta^6$-desoxycodeine with an alkali metal alkoxide in a lower alkanol, whereby the desired 6-methyl-$\Delta^6$-desoxymorphine is obtained.

I ordinarily conduct this demethylation reaction utilizing, as the lower alkanol, methanol, ethanol, isopropanol, n-propanol, isobutanol, or amyl alcohol, and, as the alkali metal alkoxide, sodium methoxide, potassium methoxide, sodium ethoxide, potassium ethoxide, sodium isopropoxide, potassium isopropoxide, sodium n-propoxide, potassium n-propoxide, sodium isobutoxide, potassium isobutoxide, sodium pentanoxide or potassium pentanoxide. The temperature employed in my reaction is critical and should be between about 110 and 160° C.; within this temperature range the reaction is ordinarily complete after a heating period of about twenty-four to forty-eight hours. I have found that, at lower temperatures, no appreciable demethylation takes place, whereas, at higher temperatures extensive decomposition of the molecule occurs. Although not essential, I ordinarily carry out the demethylation reaction in the substantial absence of oxygen as, for example, in contact with a nitrogen atmosphere.

In accordance with my preferred procedure, a mixture of 6-methyl-$\Delta^6$-desoxycodeine, sodium ethoxide and ethanol is heated in a sealed vessel in contact with a nitrogen atmosphere at a temperature of about 150° C.; under these reaction conditions, the demethylation reaction is substantially complete after a heating period of approximately thirty hours.

The 6-methyl-$\Delta^6$-desoxymorphine is conveniently recovered as follows: the reaction mixture is diluted with water and the lower alkanol is evaporated from the aqueous alcoholic solution; the aqueous alkaline solution thus obtained is filtered and the filtered solution extracted with a water-immiscible organic solvent such as chloroform thereby removing any unreacted 6-methyl-$\Delta^6$-desoxycodeine which may be present; the pH of the aqueous solution is then adjusted to approximately 9 and the resulting solution is extracted with a water-immiscible organic solvent such as chloroform; upon evaporation of the organic solvent extract there is obtained the desired 6-methyl-$\Delta^6$-desoxymorphine.

The following examples illustrate methods of carrying out the present invention, but it is to be understood that these examples are given for purposes of illustration and not of limitation.

*Example 1*

Four grams of sodium metal were dissolved in 100 ml. of absolute ethanol and to the solution was added one gram of 6-methyl-$\Delta^6$-desoxycodeine. The solution was placed in a glass-lined autoclave, the space above the solution was flushed twice with dry nitrogen gas, and then the contents of the autoclave were placed under nitrogen at a pressure of 200–500 pounds per square inch. The autoclave and its contents were then heated at a temperature of about 150° C. for a period of about thirty hours. Fifty milliliters of water were then added to the reaction solution, and the ethanol was evaporated from the aqueous ethanolic solution under reduced pressure. The resulting aqueous alkaline solution was filtered and the filtered solution was extracted with chloroform. The filtered and extracted aqueous alkaline solution was then adjusted to a pH of approximately 9 by the addition of aqueous hydrochloric acid solution, and the resulting solution was extracted with chloroform. The latter chloroform extract was evaporated to dryness under reduced pressure and the slightly-colored, residual material was dissolved in 20 ml. of hot acetone, treated with activated charcoal, and the filtered solution evaporated to approximately 4 ml. volume. Upon cooling this concentrated acetone solution, a crystalline product precipitated; this was recovered and recrystallized from acetone to give substantially pure 6-methyl-$\Delta^6$-desoxymorphine; M. P. 239–240° C.

*Example 2*

Two grams of sodium metal were dissolved in 100 ml. of absolute ethanol and to the solution was added one gram of 6-methyl-$\Delta^6$-desoxycodeine. The resulting solution was placed under nitrogen at a pressure of about 500 pounds per square inch and treated at a temperature of approximately 140° C. for a period of about twenty-four hours. The reaction solution was diluted with water, the ethanol evaporated and the resulting aqueous alkaline solution filtered and extracted in the same manner as that described in Example 1 hereinabove to give 6-methyl-$\Delta^6$-desoxymorphine.

Various changes and modifications may be made in carrying out the present invention without departing from the spirit and scope thereof. Insofar as these changes and

I claim:

1. The process which comprises heating together, in a lower alkanol, 6-methyl-Δ⁶-desoxycodeine and an alkali metal alkoxide, thereby forming 6-methyl-Δ⁶-desoxymorphine.

2. The process which comprises heating together, in a lower alkanol and at a temperature within the range of approximately 110–160° C., 6-methyl-Δ⁶-desoxycodeine and an alkali metal alkoxide, thereby forming 6-methyl-Δ⁶-desoxymorphine.

3. The process which comprises heating together, in ethanol at a temperature of approximately 150° C., 6-methyl-Δ⁶-desoxycodeine and sodium ethoxide, thereby forming 6-methyl-Δ⁶-desoxymorphine.

4. The process which comprises heating together, in a lower alkanol and in the substantial absence of oxygen, 6-methyl-Δ⁶-desoxycodeine and an alkali metal alkoxide, thereby forming 6-methyl-Δ⁶-desoxymorphine.

5. The process which comprises heating together, in a lower alkanol, under a nitrogen atmosphere and at a temperature within the range of approximately 110–160° C., 6-methyl-Δ⁶-desoxycodeine and an alkali metal alkoxide, thereby forming 6-methyl-Δ⁶-desoxymorphine.

6. The process which comprises heating together, in ethanol, under a nitrogen atmosphere and a temperature of approximately 150° C., 6-methyl-Δ⁶-desoxycodeine and sodium ethoxide, thereby forming 6-methyl-Δ⁶-desoxymorphine.

References Cited in the file of this patent

Small: J. Organic Chem. 3, p. 213, pp. 228–229 (1938).